United States Patent [19]

Begun et al.

[11] Patent Number: 5,182,809
[45] Date of Patent: Jan. 26, 1993

[54] DUAL BUS MICROCOMPUTER SYSTEM WITH PROGRAMMABLE CONTROL OF LOCK FUNCTION

[75] Inventors: Ralph M. Begun, Boca Raton; Patrick M. Bland; Philip E. Milling, both of Delray Beach, all of Fla.

[73] Assignee: International Business Machines Corporation, Armonk, N.Y.

[21] Appl. No.: 358,810

[22] Filed: May 31, 1989

[51] Int. Cl.$^5$ .............................................. G06F 9/00
[52] U.S. Cl. ........................... 395/725; 364/DIG. 1; 364/228.1; 364/238.4; 364/240.8; 364/243.41; 364/243.42; 364/243.5; 364/268.6
[58] Field of Search ............ 364/200 MS File, 246.8, 364/900 MS File, DIG. 1, DIG. 2; 395/275, 725

[56] References Cited

U.S. PATENT DOCUMENTS

| | | | |
|---|---|---|---|
| 4,394,727 | 7/1983 | Hoffman et al. | 364/200 |
| 4,432,050 | 2/1984 | Harris et al. | 364/200 |
| 4,435,766 | 5/1984 | Haber et al. | 364/200 |
| 4,488,217 | 12/1984 | Binder et al. | 364/200 |
| 4,587,609 | 1/1986 | Boudreau et al. | 364/200 |
| 4,590,552 | 5/1986 | Guttag et al. | 364/200 |
| 4,665,484 | 5/1987 | Nanba | 364/200 |
| 4,727,486 | 2/1988 | Smith et al. | 364/200 |
| 4,949,239 | 8/1990 | Gillett, Jr. et al. | 364/200 |
| 4,959,860 | 9/1990 | Watters et al. | 350/4 |
| 4,984,153 | 1/1991 | Kregness et al. | 364/200 |
| 5,041,962 | 8/1991 | Lunsford | 364/200 |

OTHER PUBLICATIONS

"80386 Hardware Reference Manual", *Intel Corporation*, 1986, Chapter 7-Cache Subsystems.
"Introduction to the 80386 including the 80386 Data Sheet", *Intel Corporation*, Apr. 1986.
"82385 High Performance 32-Bit Cache Controller", *Intel Corporation*, Jul. 1987.

*Primary Examiner*—Michael R. Fleming
*Assistant Examiner*—Ayaz R. Sheikh
*Attorney, Agent, or Firm*—Michael J. Buchenhorner; Stanley B. Green

[57] ABSTRACT

A dual bus microcomputer system including a cache subsystem improves performance under certain circumstances by allowing programmable control over the LOCK function. More particularly, additional logic is coupled between the LOCK output of the CPU and the LOCK input of the cache controller. A control bit from an I/O port is a second input to the additional logic. With the control bit in one state, the logic allows the LOCK input to follow the LOCK output. In the other state of the control bit, the LOCK input is disabled regardless of the state of the LOCK output.

4 Claims, 3 Drawing Sheets

| LOCK OUT | CONTROL | LOCK IN |
|---|---|---|
| 0 | 0 | 0 |
| 1 | 0 | 1 |
| 0 | 1 | 1 |
| 1 | 1 | 1 |

LOCK OUT, LOCK IN, ACTIVE LOW, DISABLED HIGH

CONTROL − DISABLE LOCK − HIGH

ENABLE LOCK − HIGH

DUAL BUS MICROCOMPUTER SYSTEM WITH PROGRAMMABLE CONTROL OF LOCK FUNCTION

TECHNICAL FIELD

The present invention relates to microcomputer systems, particularly microcomputer systems employing a cache subsystem, and provides for programmable control over a LOCK function.

BACKGROUND ART

The use of cache subsystems in microcomputer systems leads to a number of attractive operating advantages. Microcomputer systems employing cache subsystems are in effect dual bus microcomputers. The CPU and cache subsystem are connected together via what can be referred to as a CPU local bus. Separate from the CPU local bus is a system bus to which other devices (I/O devices, additional memory, etc.) can be connected. The presence of the cache subsystem relieves the system bus from any read memory access to the extent that the information sought is also found in the cache subsystem. Because not all desired information will be found in the cache subsystem, and write operations are usually directed to both the cache subsystem and to memory, there must of course be some connection between the system bus and the CPU local bus.

Under certain circumstances, however, the CPU and/or the cache controller is arranged to inhibit cache operations for certain commands. For example, the 80386 CPU includes a LOCK signal for multiprocessor and multimaster designs. The signal tells other bus masters that the processor is performing a multiple bus cycle operation that must not be interrupted. The 80386 for example automatically asserts LOCK when it updates the segment descriptor and page tables, during interrupt acknowledge bus cycles, and when it executes the Exchange instruction. The manufacturer of the 80386 recommends that the LOCK output of the 80386 be tied to a LOCK input of a cache controller. The cache controller, since it has visibility of not only the CPU local bus (on which the cache memory resides) but also the system bus (on which main and other memory resides) has the capability of allowing a cache operation or inhibiting the cache operation. Typically, the cache controller (such as an 83285) will prevent a cache operation for any cycle on which the LOCK input is asserted.

The characteristics of the 80386 and 83285 devices are described in "Microprocessor and Peripheral Handbook", "83285 High Performance 32-Bit Cache Controller" and "Introduction to the 80386" and the 80386 Hardware Reference Manual, all published by Intel. The "83285 High Performance 32-Bit Cache Controller" indicates (Section 3.4.2) that when the LOCK output (of the 80386) is asserted, a sequence is run on the system bus regardless of whether any locations referenced in the sequence reside in cache.

In other words, a read hit will be run as if it were a read miss.

Notwithstanding the foregoing, however, in most Personal Computer (PC) environments, descriptors are not shared between system processors. As a result, the effect of assertion of the LOCK signal causes a significant performance degradation, especially when operating in an 80386 protect mode. This performance degradation comes about because the 83285 cache controller treats all locked operations as non-cacheable.

SUMMARY OF THE INVENTION

In order to solve the problem, the invention provides additional logic coupled between a LOCK output (of the 80386 for example) and the LOCK input (of the 83285 for example). This additional logic includes a control input terminal which can be in either of two binary states. The control input terminal of the additional logic is driven by a particular bit of a selected I/O port. When the particular bit of the I/O port is asserted, its effect on the logic is to disable any relationship between the LOCK output (of the 80386) and the LOCK input (of the 83285). More particularly, when the selected bit of the I/O port is active, the LOCK input (of the 83285) is inactive, regardless of the LOCK output of the 80386. On the other hand, with the selected bit of the I/O port in an inactive state, the logic allows the LOCK input of the 83285 to follow the states of the LOCK output of the 80386.

Accordingly, the state of the selected bit of the I/O port either enables the LOCK function of the microcomputer system or disables the LOCK function.

In a preferred embodiment of the invention, which is implemented in a PS/2 ® microcomputer system produced by the assignee of this application, which is a single processor or single bus master system, disabling the LOCK function produces significant performance increases (up to 6%) when operating under OS/2 ® operating system. The performance increases are attributed to achieving improvements in performance by use of the cache subsystem. In the absence of the present invention, the CPU and cache controller inhibit use of the cache subsystem (and its performance advantages) under the prescribed operating conditions.

In a preferred embodiment of the invention, the LOCK inputs and outputs are active low, the additional logic comprises a single OR gate. In this embodiment, the LOCK function is disabled by a high control input to the OR gate from the particular bit of the I/O port. On the other hand, when the particular bit of the I/O port is in a low state, the LOCK functions operate as in the prior art.

By providing programmability of the control input to the additional logic, the microcomputer system can be allowed to operate as if the additional logic were not present when the particular bit of the I/O port (the control bit) is low. On the other hand, when the particular bit or control input is high, then the LOCK functions are disabled. As is apparent to those skilled in the art, control over the LOCK function is thereby placed in the software which controls the status of the particular bit of the selected I/O port.

Accordingly, the invention provides a multi-bus microcomputer system comprising:

a CPU and a cache subsystem connected together by a CPU local bus, said cache subsystem comprising an 83285 cache controller and a cache memory, system bus means connecting said 83285 to a random access memory and a plurality of addressable functional units, said CPU having a LOCK output and said 83285 having a LOCK input, and logic means coupled between said LOCK output of said CPU and said LOCK input of said 83285, said logic means including a control input for disabling any relationship between said LOCK output and said LOCK input.

Those skilled in the art will understand that the invention can be applied to microcomputer systems which do not employ the 80386 CPU, the 83285 cache controller, or either of them. More particularly, the invention is applicable to any multi-bus microcomputer system including a cache subsystem wherein the CPU includes a LOCK signal which is responded to by the cache controller to inhibit cache operations.

Accordingly, in another aspect the invention provides a multi-bus microcomputer system including:

a CPU and a cache subsystem connected together by a CPU local bus, said cache subsystem comprising a cache controller and a cache memory, system bus means connecting said cache controller to a random access memory and a plurality of addressable functional units, said CPU having a LOCK output and said cache controller having a LOCK input, said cache controller including means for treating any cycle associated with an active LOCK input as a non-cacheable cycle, and logic means coupled between said LOCK output of said CPU and said LOCK input of said cache controller, said logic means including a control input for disabling any relationship between said LOCK output and said LOCK input.

DETAILED DESCRIPTION OF PREFERRED EMBODIMENTS

Figure 1:
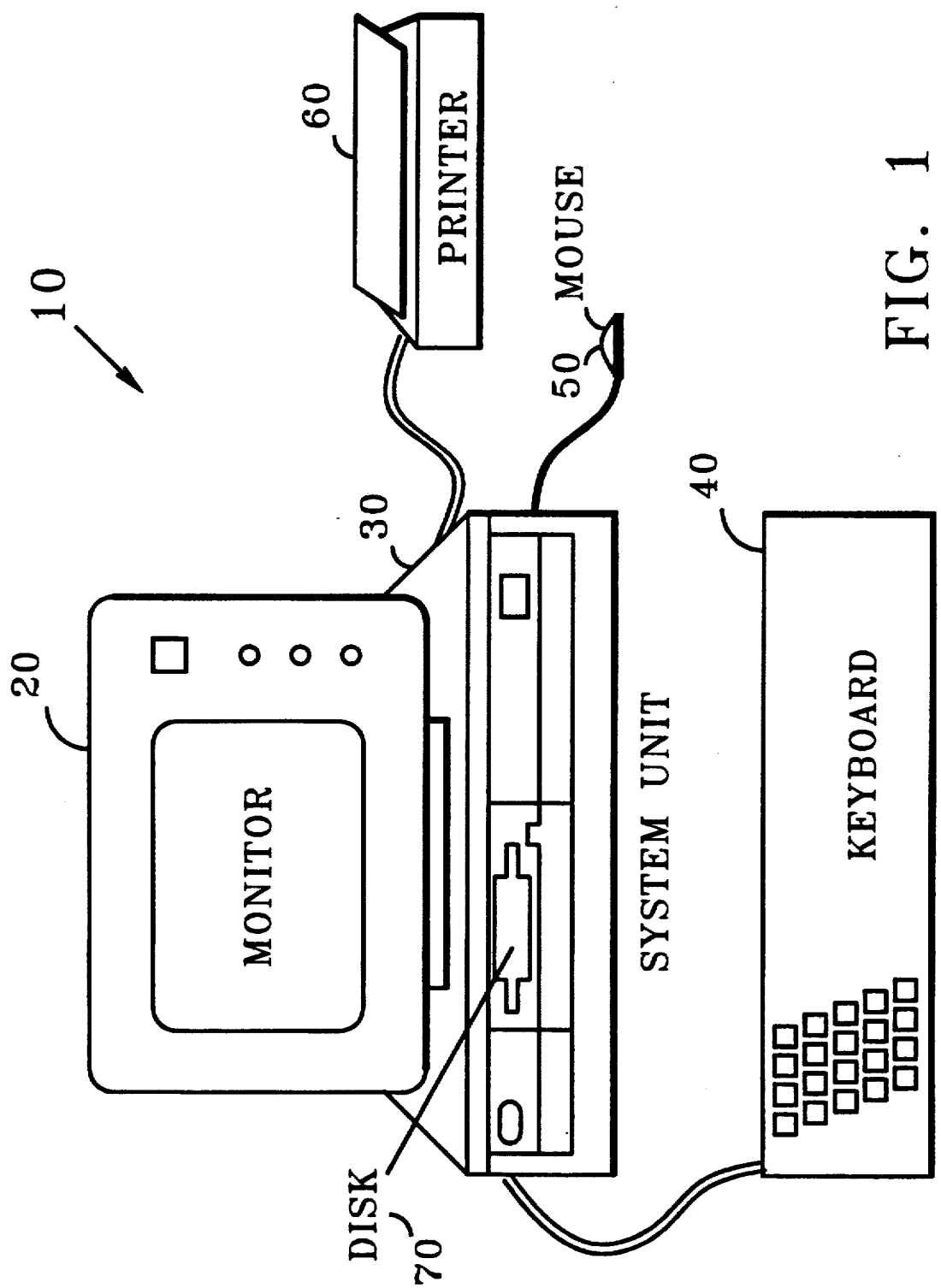
FIG. 1 is an overall three-dimensional view of a typical microcomputer system employing the present invention.

FIG. 1 shows a typical microcomputer system in which the present invention can be employed. As shown, the microcomputer system 10 comprises a number of components which are interconnected together. More particularly, a system unit 30 is coupled to and drives a monitor 20 (such as a conventional video display). The system unit 30 is also coupled to input devices such as a keyboard 40 and a mouse 50. An output device such as a printer 60 can also be connected to the system unit 30. Finally, the system unit 30 may include one or more disk drives, such as the disk drive 70. As will be described below, the system unit 30 responds to input devices such as the keyboard 40 and the mouse 50, and input/output devices such as the disk drive 70 for providing signals to drive output devices such as the monitor 20 and the printer 60. Of course, those skilled in the art are aware that other conventional components can also be connected to the system unit 30 for interaction therewith. In accordance with the present invention, the microcomputer system 10 includes (as will be more particularly described below) a cache memory subsystem such that there is a CPU local bus interconnecting a processor, a cache control and a cache memory which CPU local bus is coupled via a buffer to a system bus. The system bus is interconnected to and interacts with the I/O devices such as the keyboard 40, mouse 50, disk drive 70, monitor 20 and printer 60. Furthermore, in accordance with the present invention, the system unit 30 may also include a third bus comprising a Micro Channel (TM) bus for interconnection between the system bus and other (optional) input/output devices, memory, etc.

Figure 2:
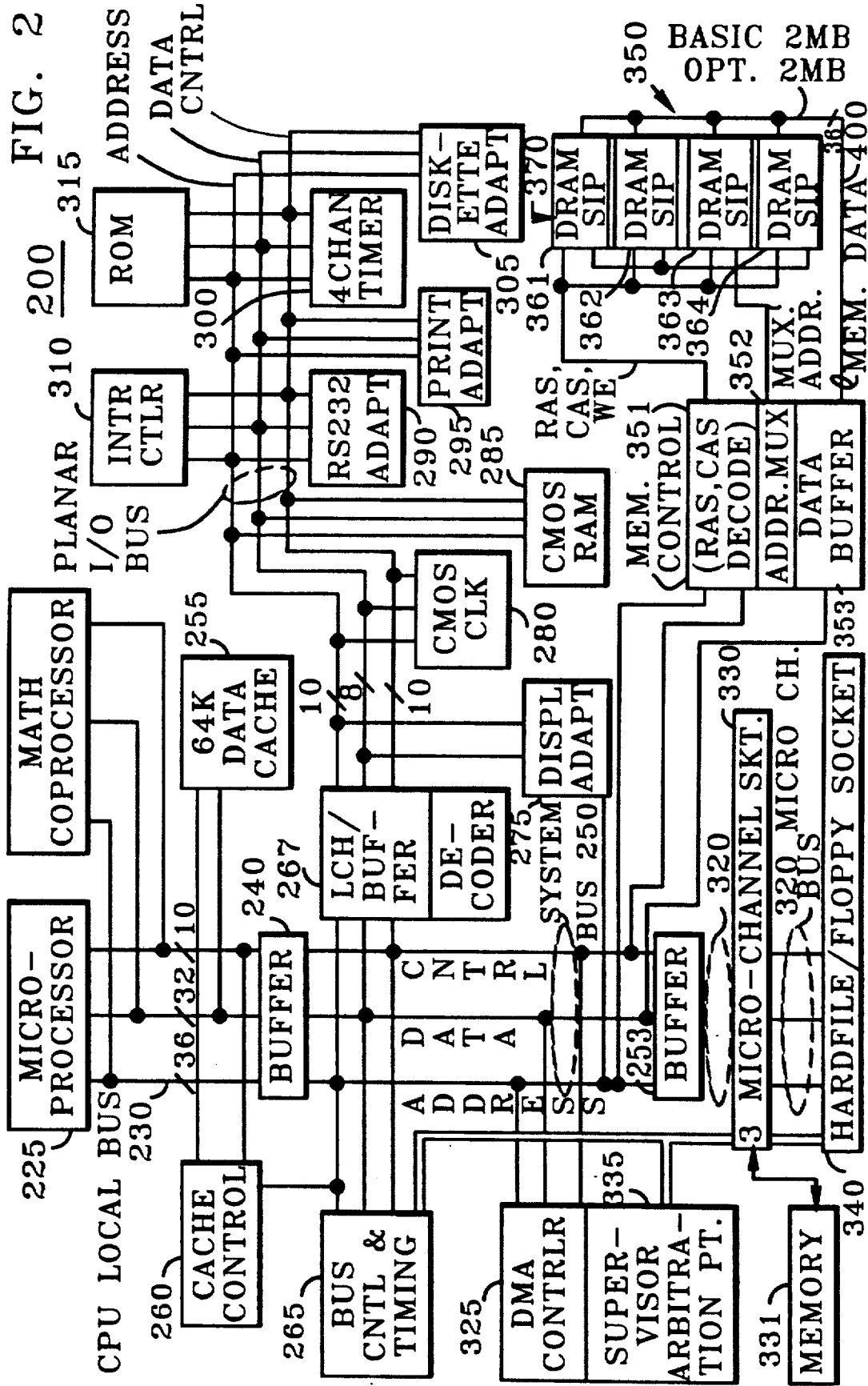
FIG. 2 is a detail block diagram of a majority of the components of a typical microcomputer system employing the present invention.

FIG. 2 is a high level block diagram illustrating the various components of a typical microcomputer system in accordance with the present invention. A CPU local bus 230 (comprising data, address and control components) provides for the connection of a microprocessor 225 (such as an 80386), a cache control 260 (which may include an 83285 cache controller) and a random access cache memory 255. Also coupled on the CPU local bus 230 is a buffer 240. The buffer 240 is itself connected to the system bus 250, also comprising address, data and control components. The system bus 250 extends between the buffer 240 and a further buffer 253.

The system bus 250 is also connected to a bus control and timing element 265 and a DMA controller 325. An arbitration control bus 340 couples the bus control and timing element 265 and a central arbitration element 335. Memory 350 is also connected to the system bus 250. The memory 350 includes a memory control element 351, an address multiplexer 352 and a data buffer 353. These elements are interconnected with memory elements 360 through 364, as shown in FIG. 2.

A further buffer 267 is coupled between the system bus 250 and a planar bus 270. The planar bus 270 includes address data and control components, respectively. Coupled along the planar bus 270 are a variety of I/O adaptors and other components such as the display adaptor 275 (which is used to drive the monitor 20), a clock 280, additional random access memory 285, an RS 232 adaptor 290 (used for serial I/O operations), a printer adaptor 295 (which can be used to drive the printer 60), a timer 300, a diskette adaptor 305 (which cooperates with the disk drive 70), an interrupt controller 310 and read only memory 315. The buffer 253 provides an interface such as the Micro Channel (TM) bus 320 represented by the Micro Channel (TM) sockets. Devices such as memory 331 may be coupled to the bus 320.

While data for cache writes may be derived from memory 350, such data may also be derived from other memory such as memory installed on the Micro Channel (TM) bus.

Figures 3, 4:
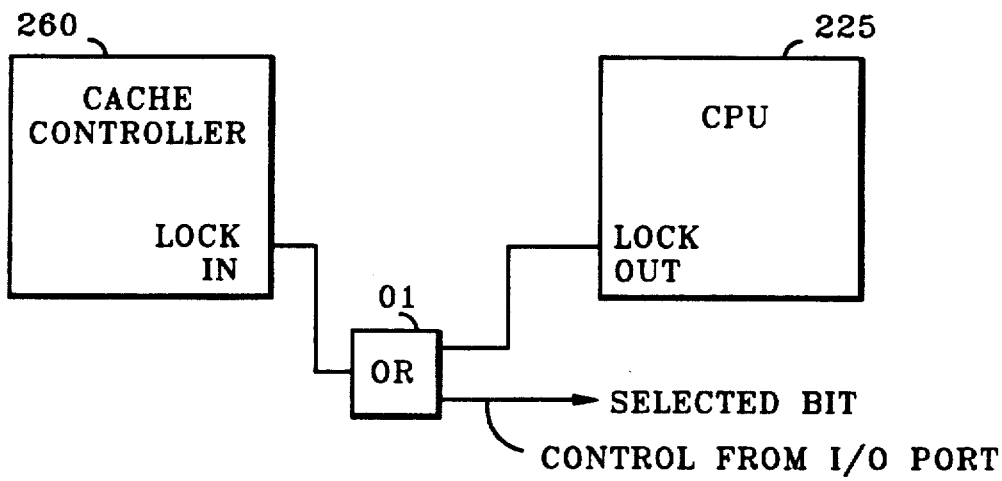
FIGS. 3 and 4 shows the relationship between a CPU, a cache controller and the added logic according to the present invention.

FIGS. 3 and 4 show application of the present invention to the relationship between the LOCK output of the CPU 225 and the LOCK input of the cache controller 260. The table in FIG. 4 is a state diagram showing the relationship between LOCK output, the control input to the OR gate O1 and the output of the OR gate O1, connected to the LOCK input of the cache controller 260. The legend below FIG. 4 indicates that the LOCK signals are active low, the LOCK function is disabled for high signals. The control signal in the low state enables the LOCK input to follow the LOCK output, whereas in the high state, the LOCK input is disabled (high) regardless of the state of the LOCK output.

In a preferred embodiment, the CPU 225 comprises an 80386, the cache controller 260 comprises an 83285. The control input terminal to the OR gate O1 can be connected to any particular bit from any selected I/O port. When so connected, the state of that I/O port bit will determine whether the LOCK input of the cache controller 260 does or does not follow the state of the LOCK output of the CPU 225. In the case where the LOCK input of the cache controller 260 does not follow the state of the LOCK output of the CPU 225, it is in a disabled or high state. In this state, as is apparent to those skilled in the art, the cache controller 260 will determine whether or not any cycle is cacheable based on other parameters. On the other hand, in the event the control bit is low (enabling the LOCK) function, then the cache controller 260 will treat any cycle associated with a low state of the CPU 225's LOCK output low, as non-cacheable regardless of these other parameters.

Accordingly, the invention provides the ability for enabling or disabling the LOCK function under control of software and in a manner which is entirely transparent to the CPU 225.

It should be apparent that while in a preferred embodiment the CPU 225 comprises an 80386 and the cache controller 260 comprises an 83285, application of the invention is not limited to use in microcomputer systems including these devices. Rather, any microcomputer system including a cache subsystem which replicates the LOCK function characteristics of the 80386/82385 is a candidate for application of the present invention. It should also be apparent that the invention can also be applied in microcomputer systems wherein the LOCK signal is active high rather than active low. For example, the active high condition can be treated by replacing the OR gate O1 with an AND gate along with appropriate changes to the status of the control bit. With active high signals, and using an AND gate as the additional logic, a high control signal allows the LOCK input to follow the LOCK output, whereas a low control bit disables the LOCK input.

While a preferred embodiment of the invention has been described herein, it should be apparent from the foregoing that many changes can be made within the spirit and scope of the invention. Accordingly the invention should be construed by the claims attached hereto rather than by the specific example described herein.

We claim:

1. A multi-bus microcomputer system comprising:
   a CPU and a cache subsystem connected together by a CPU local bus, said cache subsystem comprising an 82385 cache controller and a cache memory, system bus means connecting said 82385 cache controller to a random access memory and a plurality of addressable functional units, said CPU having a LOCK output and said 82385 cache controller having a LOCK input, and
   logic means with a control input, said logic means coupled between said LOCK output of said CPU and said LOCK input of said 82385 cache controller, said logic means producing, in response to a predetermined signal on said control input, an inactive signal to said LOCK input of said 82385 cache controller to disable said LOCK input of said 82385 cache controller and, in absence of said predetermined signal, allowing said LOCK inputs of said 82385 cache controller to follow said LOCK output of said CPU.

2. A multi-bus microcomputer system as recited in claim 1 wherein said logic means comprises an OR gate.

3. A multi-bus microcomputer system comprising:
   a CPU and a cache subsystem connected together by a CPU local bus, said cache subsystem comprising a cache controller and a cache memory, system bus means connecting said cache controller to a random access memory and a plurality of addressable functional units, said CPU having a LOCK output and said cache controller having a LOCK input, said cache controller including means for treating any cycle associated with an active LOCK input as a non-cacheable cycle, and
   logic means coupled between said LOCK output of said CPU and said LOCK input of said cache controller, said logic means including a control input, said logic means generating a LOCK input signal in response to a signal on said control input, said LOCK input signal comprising either a signal equivalent to said LOCK output signal or comprising an inactive LOCK input signal for disabling said LOCK input, and logic means responding to said control input in a high state to thereby disable said LOCK input to control said LOCK input to an inactive state regardless of said LOCK output, and responding to said control input in a low state to require said LOCK input to follow said LOCK output.

4. A multi-bus microcomputer system as recited in claim 3 wherein said logic means comprises an OR gate.

* * * * *